United States Patent
Schneider et al.

(10) Patent No.: US 9,996,173 B2
(45) Date of Patent: Jun. 12, 2018

(54) FRONT PANEL OVERLAY INCORPORATING A LOGIC CIRCUIT

(71) Applicant: Illinois Tool Works, Inc., Glenview, IL (US)

(72) Inventors: John H. Schneider, Frankfort, IL (US); William A. Herring, Valparaiso, IN (US); Daniel W. Johnston, Fremont, CA (US)

(73) Assignee: ILLINOIS TOOL WORKS, INC., Glenview, IL (US)

( * ) Notice: Subject to any disclaimer, the term of this patent is extended or adjusted under 35 U.S.C. 154(b) by 270 days.

(21) Appl. No.: 13/765,418

(22) Filed: Feb. 12, 2013

(65) Prior Publication Data
US 2014/0225837 A1    Aug. 14, 2014

(51) Int. Cl.
| | |
|---|---|
| *G06F 3/041* | (2006.01) |
| *H01H 13/704* | (2006.01) |
| *H01H 13/81* | (2006.01) |
| *H01H 13/88* | (2006.01) |

(52) U.S. Cl.
CPC ........... *G06F 3/041* (2013.01); *H01H 13/704* (2013.01); *H01H 13/81* (2013.01); *H01H 13/88* (2013.01); *H01H 2207/004* (2013.01); *H01H 2229/002* (2013.01); *H01H 2229/03* (2013.01); *H01H 2239/01* (2013.01)

(58) Field of Classification Search
CPC ..................................................... G06F 3/041
USPC .......... 345/156, 173–179; 200/5 A, 505–512
See application file for complete search history.

(56) References Cited

U.S. PATENT DOCUMENTS

| | | | | |
|---|---|---|---|---|
| 3,732,389 | A * | 5/1973 | Kaelin et al. ................. | 200/313 |
| 4,158,230 | A * | 6/1979 | Washizuka et al. .......... | 708/142 |
| 4,375,018 | A * | 2/1983 | Petersen ....................... | 200/5 A |
| 4,570,039 | A | 2/1986 | Osawa et al. | |
| 4,640,994 | A * | 2/1987 | Komaki ........................ | 200/5 A |
| 4,812,831 | A * | 3/1989 | Laier ..................... | G06F 1/3271 |
| | | | | 345/175 |
| 4,818,827 | A * | 4/1989 | Ipcinski ................. | G09B 5/062 |
| | | | | 178/18.01 |
| 5,514,842 | A * | 5/1996 | Sugii et al. ................... | 200/5 A |

(Continued)

FOREIGN PATENT DOCUMENTS

| | | |
|---|---|---|
| DE | 203 14 013 U1 | 11/2003 |
| EP | 2319104 A1 | 5/2011 |

(Continued)

OTHER PUBLICATIONS

International Search Report and Written Opinion issued in related PCT Application No. PCT/US2014/015218; report dated Sep. 23, 2014.

*Primary Examiner* — William Lu
(74) *Attorney, Agent, or Firm* — Miller, Matthias & Hull LLP

(57) ABSTRACT

A front panel overlay having a plurality of layers and one or more logic circuits incorporated therein is disclosed. One of the plurality of layers may have a first electrical contact and another one of the plurality of layers may have a second electrical contact. The one or more logic circuits may be incorporated at least indirectly within the plurality of layers and may be activated when the first electrical contact completes an electrical circuit with the second electrical contact.

20 Claims, 11 Drawing Sheets

(56) References Cited

U.S. PATENT DOCUMENTS

| | | | | |
|---|---|---|---|---|
| 5,636,270 | A * | 6/1997 | Davey | H04M 1/275 379/350 |
| 5,810,604 | A * | 9/1998 | Kopp, Jr. | G09B 5/062 200/5 A |
| 6,164,385 | A * | 12/2000 | Buchl | A01B 63/1115 172/239 |
| 6,466,118 | B1 * | 10/2002 | Van Zeeland et al. | 335/205 |
| 7,012,971 | B2 * | 3/2006 | Chen | H04B 1/7143 375/224 |
| 8,343,569 | B2 | 1/2013 | Korson et al. | |
| 2002/0072733 | A1 * | 6/2002 | Flaherty | A61M 5/14248 604/890.1 |
| 2003/0073952 | A1 * | 4/2003 | Flaherty | A61M 5/14248 604/151 |
| 2003/0160669 | A1 * | 8/2003 | Trandafir | 335/78 |
| 2004/0090417 | A1 * | 5/2004 | Amiri | G06F 3/044 345/156 |
| 2004/0159535 | A1 * | 8/2004 | Wagner | 200/512 |
| 2004/0167501 | A1 * | 8/2004 | Island | A61B 18/203 606/9 |
| 2005/0194454 | A1 * | 9/2005 | Ferber | G06K 19/07 235/492 |
| 2005/0211785 | A1 * | 9/2005 | Ferber | G06K 19/0702 235/492 |
| 2006/0216911 | A1 * | 9/2006 | Yoshikawa | B23K 26/409 438/460 |
| 2006/0251907 | A1 * | 11/2006 | Shimizu | H01L 24/83 428/447 |
| 2007/0080458 | A1 * | 4/2007 | Ogawa | G02B 6/43 257/750 |
| 2007/0194918 | A1 * | 8/2007 | Rabinowitz | G08B 13/1454 340/568.2 |
| 2010/0145328 | A1 * | 6/2010 | Hancock | A61B 18/18 606/33 |
| 2011/0162949 | A1 * | 7/2011 | Dimig | 200/505 |
| 2012/0011715 | A1 * | 1/2012 | Shacklette et al. | 29/832 |
| 2012/0153502 | A1 | 6/2012 | Price et al. | |
| 2012/0280400 | A1 | 11/2012 | Price et al. | |

FOREIGN PATENT DOCUMENTS

| | | |
|---|---|---|
| EP | 2474029 A1 | 7/2012 |
| EP | 2504856 A1 | 10/2012 |
| GB | 2490752 A | 11/2012 |
| GB | 2492532 A | 9/2013 |
| JP | S 62 264353 A | 11/1987 |
| WO | WO-2011/121347 A1 | 10/2011 |
| WO | WO-2013/001282 A1 | 1/2013 |

* cited by examiner

FRONT PANEL OVERLAY INCORPORATING A LOGIC CIRCUIT

TECHNICAL FIELD

The present disclosure relates to front panel overlays and, more particularly, relates to a system and method for incorporating one or more logic circuits into a front panel overlay.

BACKGROUND OF THE DISCLOSURE

Front panel overlays, sometimes referred to as flat panel displays, are widely used in a variety of applications such as, but not limited to, household appliances, medical equipment or devices, personal electronics, calculators, computer keyboards, machinery panels, control panels, and the like. Generally speaking, one function served by a front panel overlay is as an operator interface for the device to which it is mounted. Depending on the device, the front panel overlay may include a number of input/output mechanisms such as lights, push buttons, switches, displays, gauges, and meters allowing a user to do such functions as turn the device on or off, enter operating instructions, time device operation, monitor parameters of the operation, and the like.

To allow for the front panel to receive such information, the front panel overlay often includes a membrane switch behind, or otherwise associated with the input/output mechanisms, which receives that input. The front panel display then transmits associated signals back to a motherboard recessed deeper within the device, receives processed signals back from the motherboard, and then displays those signals to the user by way of the output mechanisms on the front panel overlay.

The front panel display typically includes several layers, such as a graphics layer for interfacing with and receiving commands from the user by way of the aforementioned input/output devices, one or more circuit layers forming the membrane switch and containing the electronic circuitry, and optionally a base layer for providing stability and support to the otherwise flexible layers of the front panel display. Such membrane switches have several advantages over other forms of switches (e.g., mechanical switches) that are commonly employed. For example, membrane switches present a substantially flat upper surface and, they are thin and flexible, which allows them to be used in locations that may be difficult for mechanical switches to reach. Also, membrane switches are enclosed, and contain very few moving parts, so they are reliable, not impacted by dust, moisture or liquids and have long useful lives in a variety of environments. When used on medical devices and equipment, these attributes allow for a more sterile unit that can be easily cleaned and maintained.

While effective, such prior art approaches have, as mentioned above, required that the signals received at the front panel overlay be entered through the membrane switch, and then be communicated by way of associated signals back to a remote processing unit, such as a motherboard or printed circuit board, situated deep within the device on which the front panel overlay is mounted. This necessarily requires that the front panel overlay be connected to the remote electronic processing unit using a plurality of conductive traces and interconnects via a flexible cable or "tail" running from the front panel overlay to the remote electronic processing unit. The connections between the front panel overlay and the remote electronic processing unit are not only complex, they drive the cost of the device up and unnecessarily consume space within the device that may otherwise be used for enhancing the functionality of the device.

It would accordingly be beneficial if an improved front panel overlay having at least some local processing capability could be developed. It would additionally be beneficial if such an improved front panel overlay could at least partially reduce the number of connections between the front panel overlay and the remote electronic processing unit of the device employing the front panel overlay.

SUMMARY OF THE DISCLOSURE

In accordance with one aspect of the present disclosure, a front panel overlay is disclosed. The front panel overlay may include a first layer having a first electrical contact and a second layer having a second electrical contact. The front panel overlay may also include one or more logic circuits incorporated at least indirectly within one of the layers, the one or more logic circuits being activated when the first electrical contact completes an electrical circuit with the second electrical contact.

In accordance with another aspect of the present disclosure, a method of incorporating a logic circuit in a front panel overlay is disclosed. The method may include providing a plurality of layers in operational association with one another and, forming one or more logic circuits at least indirectly onto one or more of the plurality of layers. The method may also include programming the one or more logic circuits for performing at least one operation and linking the one or more logic circuits to electric circuitry on the plurality of layers using conductive traces and interconnects.

In accordance with yet another aspect of the present disclosure, a front panel overlay is disclosed. The front panel overlay may include a top circuit layer having a first electrical contact, a bottom circuit layer having a second electrical contact and a spacer layer interposed between the top circuit layer and the bottom circuit layer. The spacer layer may selectively facilitate completion of an electrical circuit by the first electrical contact and the second electrical contact. The front panel overlay may also include a logic circuit incorporated within the top circuit layer, the logic circuit being at least indirectly linked to the first electrical contact such that when the electrical circuit is completed, the logic circuit is activated.

These and other aspects and features of the present disclosure will be more readily understood upon reading the following description when taken in conjunction with the accompanying drawings.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents falling within the spirit and scope of the present disclosure.

DETAILED DESCRIPTION OF THE DISCLOSURE

Figure 1:
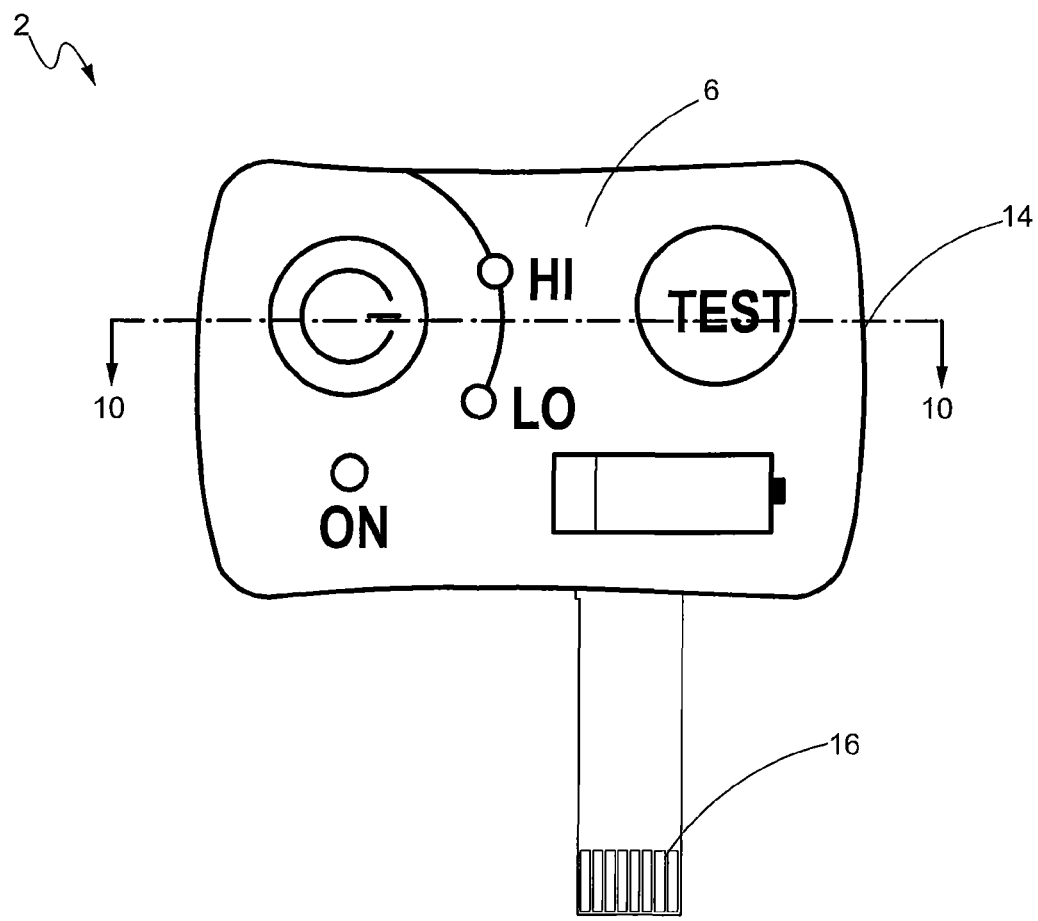
FIG. 1 is a front view of an exemplary front panel overlay, constructed in accordance with at least some embodiments of the present disclosure.
Figure 2:
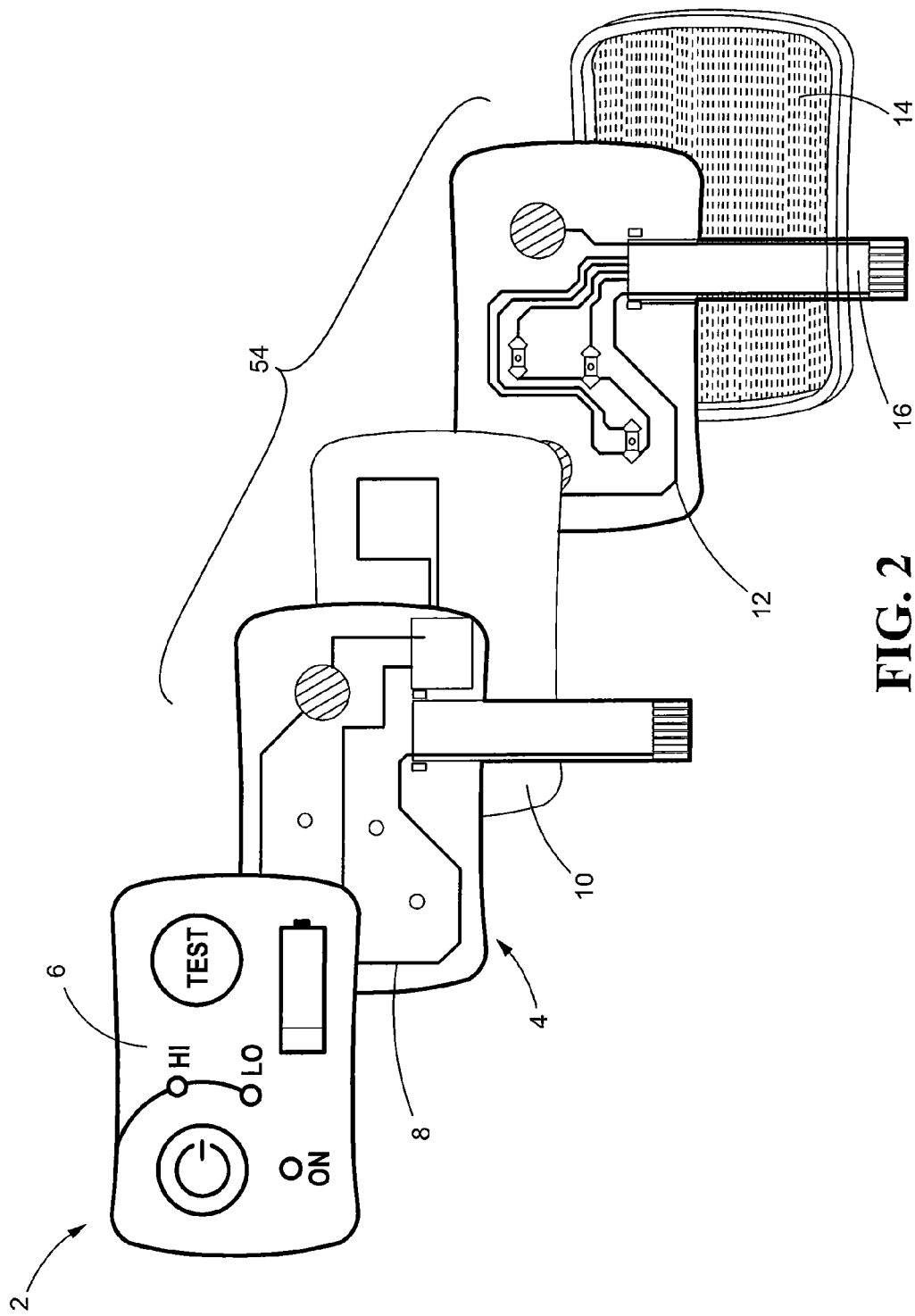
FIG. 2 is an exploded view showing the various layers of the front panel overlay of FIG. 1, in accordance with at least some embodiments of the present disclosure.

Referring now to FIG. 1 in conjunction with FIG. 1, an exemplary front panel overlay 2 is shown, in accordance with at least some embodiments of the present disclosure. Specifically, FIG. 1 is a front view of the front panel overlay 2, while FIG. 2 is an exploded view thereof. In at least some embodiments, and as shown specifically in FIG. 2, the front panel overlay 2 may be composed of a plurality of layers 4, such as, a graphics layer 6, a top circuit layer 8, a spacer layer 10, a bottom circuit layer 12 and a base layer 14. The front panel overlay 2 may also include a flex cable or "tail" 16 for providing a power supply to the front panel overlay, as well as for providing an input/output to/from the top circuit layer 8 and the bottom circuit layer 12 from/to the device employing the front panel overlay. Moreover, while the front panel overlay 2 is described as a "front" panel overlay, it is to be understood this directional modifier is only used as a term of art and in fact the technology disclosed herein can be used in conjunction with panel displays provided elsewhere on a device including other sides, and separate consoles therefore, as well.

With respect to, the plurality of layers 4, described in greater detail below, each may be a thin flexible or rigid layer with a substantially uniform thickness and operationally connected in at least indirect association with the other layers. Notwithstanding the fact that in the present embodiment, the front panel overlay 2 has been described as having five layers, in other embodiments, the number of layers may vary. Similarly, the size and shape of the layers 4 (and, therefore the size and shape of the front panel overlay 2) may vary as well.

Furthermore, at least some of the plurality of layers 4 (such as the graphics layer 6, the top circuit layer 8 and the bottom circuit layer 12) may be formed of a polymeric film composed of a polycarbonate material such as, polyethylene terephthalate (PET/PETE), Mylar®, vinyl, acrylic, polycarbonate, thermoplastics or other durable polymeric-type materials. The spacer layer 10 may be composed of a dielectric material, such as, polyester, or the like, while the base layer 14 may be composed of a rigid and durable material such as fiberglass, plastic, metal, glass, etc. Other types of material such as, elastomers and silicones that may be deemed appropriate for a particular one of the plurality of layers 4, as well as for a specific application of the front panel display 2 may be employed in other embodiments.

Figure 3:
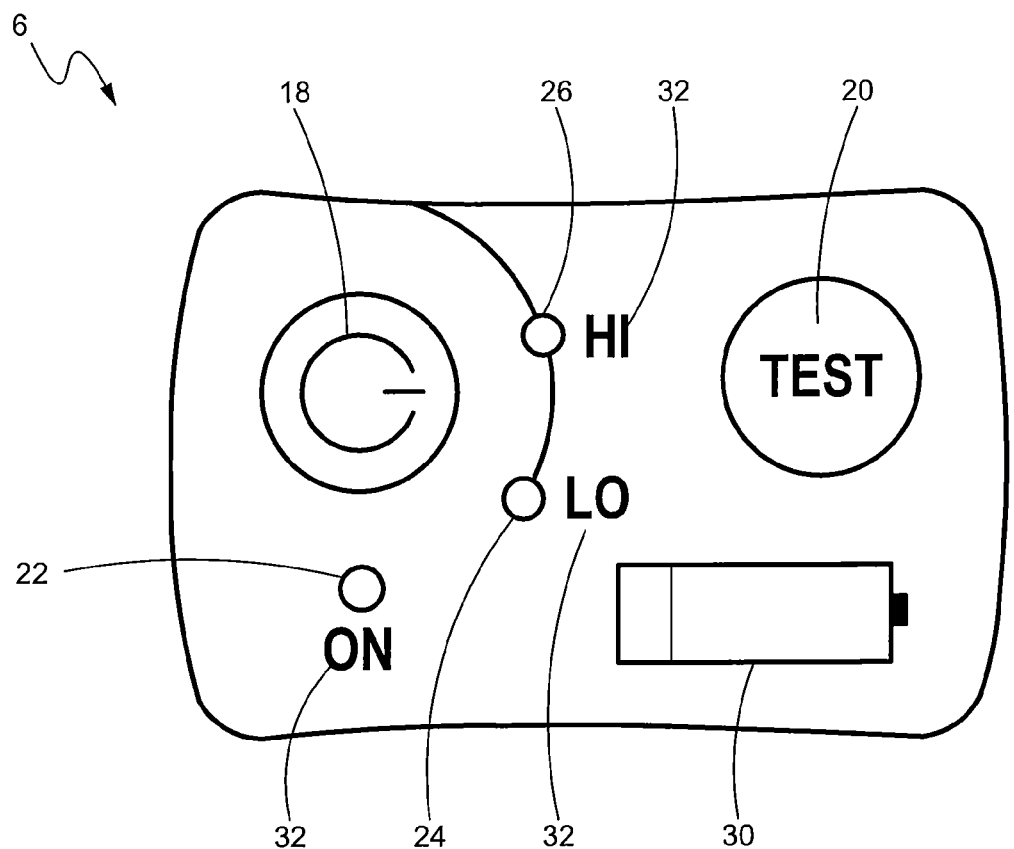
FIG. 3 is a plan view of a graphics layer of the front panel overlay of FIG. 1, constructed in accordance with at least some embodiments of the present disclosure.

Turning now to FIG. 3, the graphics layer 6 of the front panel display 2 is shown in greater detail, in accordance with at least some embodiments of the present disclosure. The graphics layer 6 may provide an operator interface to a user for interacting with and operating the front panel overlay 2, and in turn operating the machine to which the front panel overlay 2 is operatively associated, and receiving feedback therefrom. For example, the machine (not shown) may be any number of different devices such as, but not limited to, household appliances, medical devices & equipment, personal electronics, control panels, machine or vehicle consoles, and the like. To that end, the graphics layer 6 may include a variety of input/output elements, such as, visual elements (e.g., text, art/graphics, symbols, display screens, lights, gauges, meters, etc.), tactile elements (e.g., buttons, vibratory toggles, etc.), and audible elements (e.g., alarms, bells, etc.), that may both allow a user to enter information, and allow the device to convey meaningful information and feedback to the user. Such feedback may be about the front panel display 2, as well as the device to which the front panel display 2 is mounted, to assist the user in intelligently operating the same. For example, the graphics layer 6 may include a first indicia 18, a second indicia 20, a first indicator 22, a second indicator 24 and a third indicator 26. The graphics layer may also include a battery symbol 30 for informing the user that the front panel display 2 may be employed for testing a battery level of the device employing the front panel display 2 and text 32 for imparting meaning to the first, second and third indicators 22, 24 and 26, respectively.

It will be understood that although the graphics layer 6 in the present embodiment has been shown to have a specific number and certain types of elements 18-32, in other embodiments, the number, wording, symbolism, and types of those elements used may vary. Similarly, the arrangement, as well as the size, shape and presentation of those elements on the front panel display 2 may vary as well. With respect to the first indicia 18 and the second indicia 20, each of those elements may be "buttons" that may be actuated by the user to operate the front panel display 2. For example, the first indicia 18 may be actuated (e.g., by exerting a downward force thereon) by the user to turn the front panel display 2 on. Similarly, the second indicia 20 may be actuated after turning on the front panel display 2 to determine the battery level of the device employing the front panel display 2. Furthermore, in at least some embodiments, one or both of the first and the second indicia 18 and 20, respectively, may be formed as dome-shaped structures that provide a tactile effect to the user when pressed.

The first, second and third indicators 22, 24 and 26, respectively, on the other hand, which are not actuated by the user, may provide feedback to the user when the first indicia 18 and the second indicia 20 have been actuated. For example, the first indicator 22 may be activated to indicate that the front panel display 2 has been turned on when the first indicia 18 is actuated, while one of the second indicator 24 or the third indicator 26 may be activated to convey the battery level of the device when the second indicia 20 is actuated. In at least some embodiments, the first indicator 22, the second indicator 24 and the third indictor 26 may be light emitting diodes (LEDs). In other embodiments, other types of visual and/or audible indicators such as, but not limited to, the aforementioned gauges, meters, displays, sirens and the like, may be used.

Furthermore, to improve the durability of the first indicia 18, the second indicia 20, the first, second and third indicators 22, 24 and 26, respectively, the battery symbol 30 and the text 32, each of those elements may be reverse printed on the graphics layer 6. In other words, the elements (or any other elements that are formed on the graphics layer 6) may be printed or imprinted on an underside surface (e.g., the surface not visible to the user) of the graphics layer. The graphics layer 6 may also be coated with a variety of materials, such as hard scratch resistance coatings, varnishes and textures or finishes such as, matte, embossed, etc. for improving the look and feel of the front panel display 2. It will again be understood that the graphics layer 6 shown in FIG. 3 is merely exemplary. Modifications, replacements and/or enhancements to the graphics layer 6 and the elements provided thereon are contemplated and considered within the scope of the present disclosure.

Figure 4:
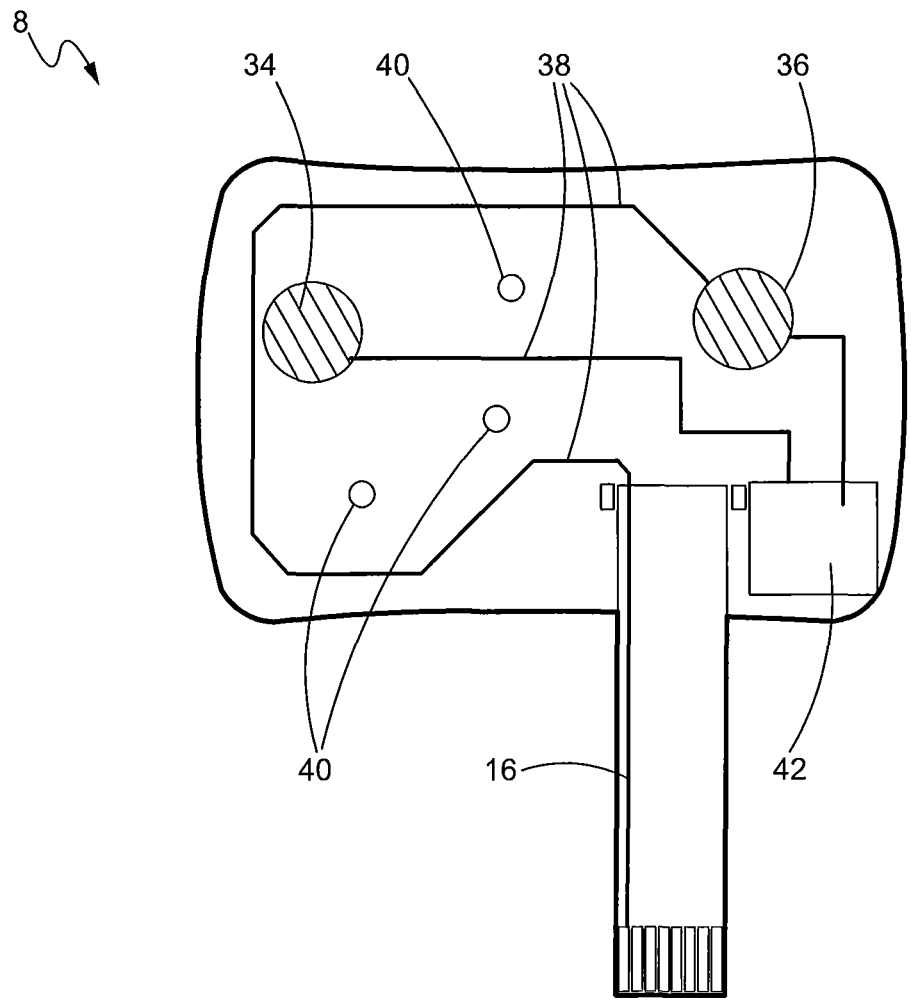
FIG. 4 is a plan view of a top circuit layer of the front panel overlay of FIG. 1, constructed in accordance with at least some embodiments of the present disclosure.

Referring now to FIG. 4, the top circuit layer 8 of the front panel display 2 is shown in greater detail, in accordance with at least some embodiments of the present disclosure. The top circuit layer 8 is substantially similar in construction, shape, size and profile to that of the graphics layer 6. However, in contrast to the graphics layer 6, which provides an interactive interface to the user, the top circuit layer 8 carries the electric circuitry (or at least a portion of the electric circuitry) of the front panel display 2 and is activated only after the first indicia 18 or the second indicia 20 have been actuated by the user.

In at least some embodiments, the top circuit layer 8 may carry electrical contacts such as, a first electrical contact 34 and a second electrical contact 36, which may be utilized for completing an electrical circuit along with the bottom circuit layer 12. The first electrical contact 34 and the second electrical contact 36 may correspond in location with the first indicia 18 and the second indicia 20, respectively, on the graphics layer 6 such that upon exerting a downward force against the first indicia (or the second indicia), a force against the first electrical contact (or the second electrical contact) may be exerted as well. Each of the first electrical contact and the second electrical contact 34 and 36, respectively, may be constructed out of any of a wide variety of conductive materials that are commonly employed in electrical circuits. In at least some embodiments and, particularly, those embodiments in which the first indicia 18 and the second indicia 20 are constructed as dome-shaped structures, the first and the second electrical contacts 34 and 36, respectively, may be provided on the underside surface of the graphics layer 6 itself. In such cases, the top circuit layer 8 may possibly be eliminated.

In addition to the first electrical contact 34 and the second electrical contact 36, the top circuit layer 8 may also include a plurality of conductive traces and interconnects 38. The conductive traces and interconnects 38 may be conductive tracks, signals or pathways that may transmit information from one point to another within the electrical circuit on the front panel display 2. While the conductive traces and interconnects 38 have been shown to be formed on a top surface of the top circuit layer 8, in some embodiments, at least a portion of the conductive traces and interconnects may be formed on a bottom surface of the top circuit layer. The conductive traces and interconnects 38 may be formed in a manner commonly known, for example, by utilizing conductive ink containing materials such as silver and copper and, printing/imprinting the conductive traces and interconnects on the top circuit layer 8. Furthermore, the conductive traces and interconnects 38 may terminate in the flex cable 16 that may or may not utilize an additional attached mechanical connector. Although not shown, shields may be utilized in conjunction with the conductive traces and interconnects 38 to prevent cross-talk between those traces. The top circuit layer 8 may additionally include cut-outs 40 for the first, second and third indicators 22, 24 and 26, respectively, as well.

In stark contrast to the prior art, the top circuit layer 8 may also include a logic circuit 42. The logic circuit 42 may be connected to the first electrical contact 34 and the second electrical contact 36 via the conductive traces and interconnects 38. Further, the logic circuit 42 may be formed at least indirectly on either or both of the top surface and the bottom surface of the top circuit layer 8. Although not necessary, typically the logic circuit 42 is formed on the same side as the first electrical contact 34, the second electrical contact 36 and the conductive traces and interconnects 38. As will be described below, in some embodiments, at least a portion of the logic circuit 42 may be provided on the bottom circuit layer 12 or elsewhere in the front panel display 2. For example, in yet other embodiments, the logic circuit 42 may be provided on the graphics layer 6 as well, specifically when the first and second electrical contacts 34 and 36, respectively, are provided on the graphics layer (e.g., when the first indicia 18 and the second indicia 20 are formed as dome-shaped structures).

The logic circuit 42 may be a computer switching circuit utilizing a plurality of logic gates for processing digital information and data (e.g., bits and bytes). The logic circuit 42 may be in the form of a very thin printed logic circuit as will be described in further detail herein, or may be a more traditional silicon chip that may be attached/transferred (e.g., by conductive adhesive) to the top circuit layer 8 and connected to the conductive traces and interconnects 38. Furthermore, the logic circuit 42 may be composed of combinational or sequential logic and may involve application specific integrated circuit (ASIC) circuits, field programmable gate arrays (FPGA) or other types of logic and integrated circuits that are commercially available. Relatedly, the logic circuit 42, to provide the thinnest form factor and the most compact design & layout, can consist of imprinted logic circuits similar to TFT's. Other more conventional components may be employed, such as diodes or transistors including, field-effect transistors (FET), metal oxide semiconductor field effect transistors (MOSFET), complementary metal oxide semiconductors (CMOS), or other devices and components that are commonly employed in logic circuit design.

The logic circuit 42 may receive digital information from the input/output port of the flex cable 16 and upon actuation of the first indicia 18 or the second indicia 20, the logic circuit may locally process the digital information and convey the battery level of the device employing the front panel display 2 to the user through the second and the third indicators 24 and 26, respectively. By virtue of utilizing and incorporating the logic circuit 42 within the front panel overlay 2 to process and perform at least one operation, the present disclosure avoids the need to provide complex, extensive cabling and circuitry leading to and from a motherboard or printed circuit board situated within the device for performing the functions performed by the logic circuit. In that regard, the front panel overlay 2 itself utilizes "embedded intelligence" and "distributed processing," specifically because the front panel overlay is no longer used as simply a data gathering and display device.

Rather, the front panel display 2 with the incorporated logic circuit 42 also serves as a programmable processing unit capable of performing a variety of intelligent functions. In so doing, not only is the cost of the device employing the front panel overlay 2 reduced (due to eliminating all the circuitry and cabling separately linking the front panel overlay 2 to a printed circuit board/motherboard deep within the device to perform all the processing functions), the profile and configuration of the front panel overlay 2 is not significantly affected (if at all). In remains thin, flexible, and potentially transparent.

Figure 5:
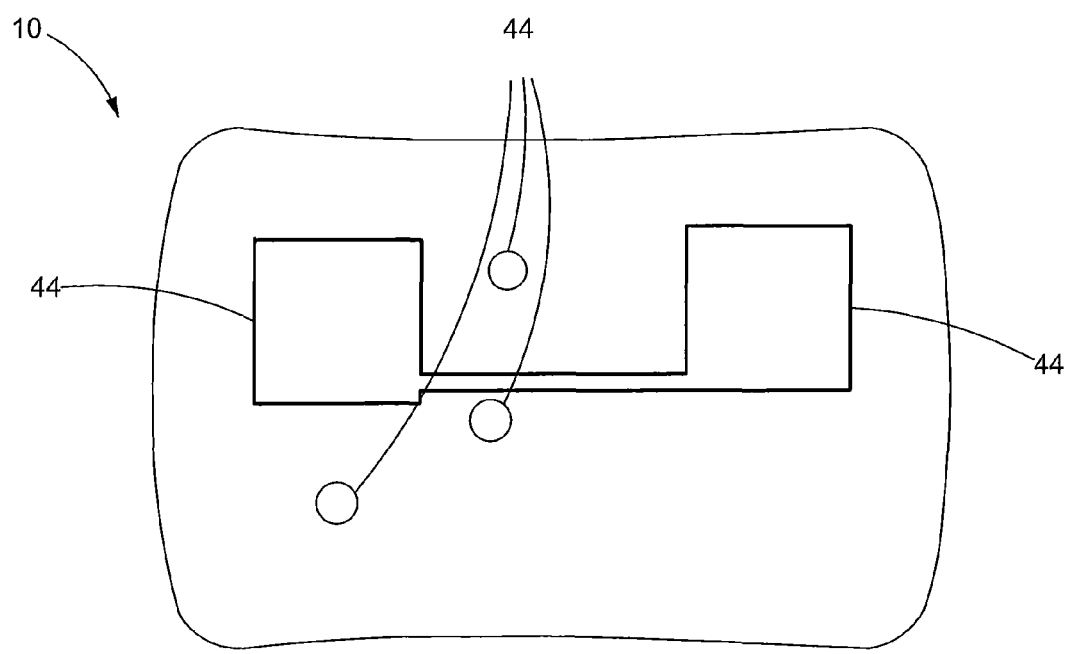
FIG. 5 is a plan view of a spacer layer of the front panel overlay of FIG. 1, constructed in accordance with at least some embodiments of the present disclosure.

Turning now to FIG. 5, the spacer layer 10 is shown in greater detail, in accordance with at least some embodiments of the present disclosure. The spacer layer 10 may be interposed between the top circuit layer 8 and the bottom circuit layer 12. The spacer layer 10 may be composed of a dielectric material and may primarily be utilized to provide a gap or selective electrical continuity between the first and the second electrical contacts 34 and 36, respectively, and the circuitry on the bottom circuit layer 12. To that end, the spacer layer 10 may include various cut-outs 44 in locations corresponding to the first indicia 18 (and the first electrical contact 34), the second indicia 20 (and the second electrical contact 36) and, the first, second and third indicators 22, 24 and 26, respectively. The cut-outs 44 may also provide venting and allow air to flow in and out during operation of the front panel overlay 2.

As will be described further below, when the first indicia 18 or the second indicia 20 are actuated by exerting a downward force thereon (as by the thumb or finger of a user), the first electrical contact 34 or the second electrical contact 36 completes an electrical circuit with circuitry on the bottom circuit layer 12 via the cut-outs 44 on the spacer layer 10. When the first indicia 18 and the second indicia 20 are not actuated, the spacer layer 10 keeps the first and the second electrical contacts 34 and 26, respectively, apart from the bottom circuit layer 12. It will be understood that in at least some embodiments, the entire electric circuitry of the front panel overlay 2 may be provided on a single layer. In those cases, the spacer layer 10 may not be needed.

Figure 6:
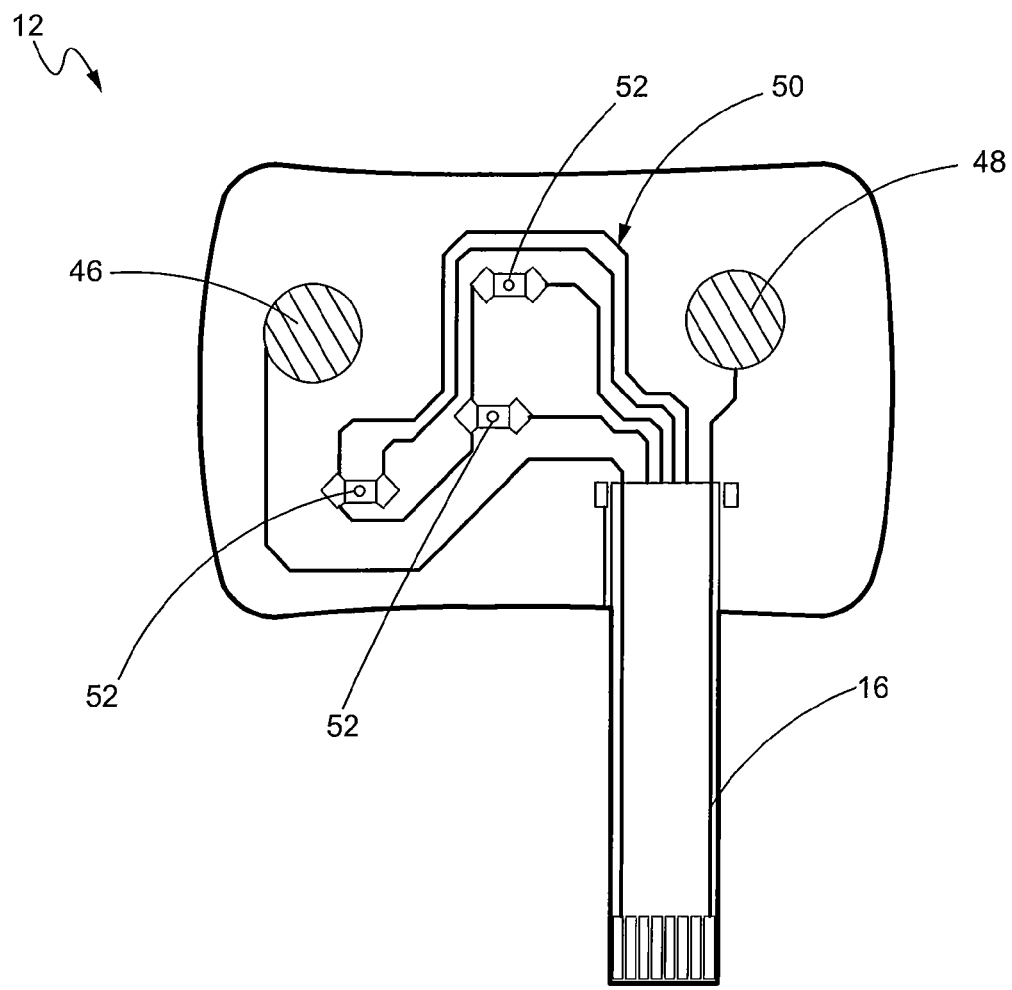
FIG. 6 is a plan view of a bottom circuit layer of the front panel overlay of FIG. 1, constructed in accordance with at least some embodiments of the present disclosure.

Below the spacer layer 10, the bottom circuit layer 12 may be arranged, as shown in FIG. 6. In accordance with at least some embodiments of the present disclosure, the bottom circuit layer 12, also termed as a static layer, may contain the main circuitry required for the front panel overlay 2 to function. For example and as shown, the bottom circuit layer 12 may include a third electrical contact 46 and a fourth electrical contact 48, both of which may be utilized for mating with the first electrical contact 34 and the second electrical contact 36, respectively, for competing the electrical circuit. The bottom circuit layer 12 may also include a plurality of conductive traces and interconnects 50, as well as light emitting diodes 52 or the like that provide a visual brother form of feedback signal to the user through the first, second and third indicators 22, 24 and 26, respectively.

Similar to the conductive traces and interconnects 38, the conductive traces and interconnects 50 may be printed or imprinted on an upper or lower surface of the bottom circuit layer 12 using conductive inks containing conductive materials such as silver, copper and/or carbon. Although not shown, in addition to the above described components, the bottom circuit layer 12 may include support connectors, fiber optic components, the flex cable 16, as well as other types of components and circuitry. As discussed above, the flex cable 16 is merely intended to provide power and input/output connections to the top circuit layer 8 and the bottom circuit layer 12. The flex cable 16 is not intended to link the circuitry on the top and the bottom circuit layers 8 and 12, respectively, to any printed circuit board or processing components within the device employing the front panel overlay 2. The logic circuit 42 embedded or at least indirectly connected or mounted to the top circuit layer 8 provides the processing capability to the front panel overlay 2.

Along with the logic circuit 42, in at least some embodiments, additional logic circuits may be provided on the bottom circuit layer 12. For example, in at least some embodiments, the logic circuit 42 may be divided into multiple smaller logic circuits, some of which may be provided on the bottom circuit layer 12. In some other embodiments, functionality in addition to that provided by the logic circuit 42 may be achieved by another logic circuit on the bottom circuit layer 12. Alternatively, the logic circuit 42 may be formed or connected to the bottom circuit layer 12 in lieu of the top circuit layer 8. To that extent, the present disclosure provides a flexible mechanism to embed the logic circuit(s) as desired within the plurality of layers 4 of the front panel overlay 2.

It will also be understood that the logic circuit 42, as well as any additional logic circuits may be provided on layers other than the top circuit layer 8 and the bottom circuit layer 12 of the front panel overlay 2 as well. For example, when the first and the second electrical contacts 34 and 36, respectively, are formed directly on the graphics layer 6, in those embodiments, the logic circuit 42 may be at least indirectly connected to or printed/imprinted on the graphics layer instead.

Figure 7:
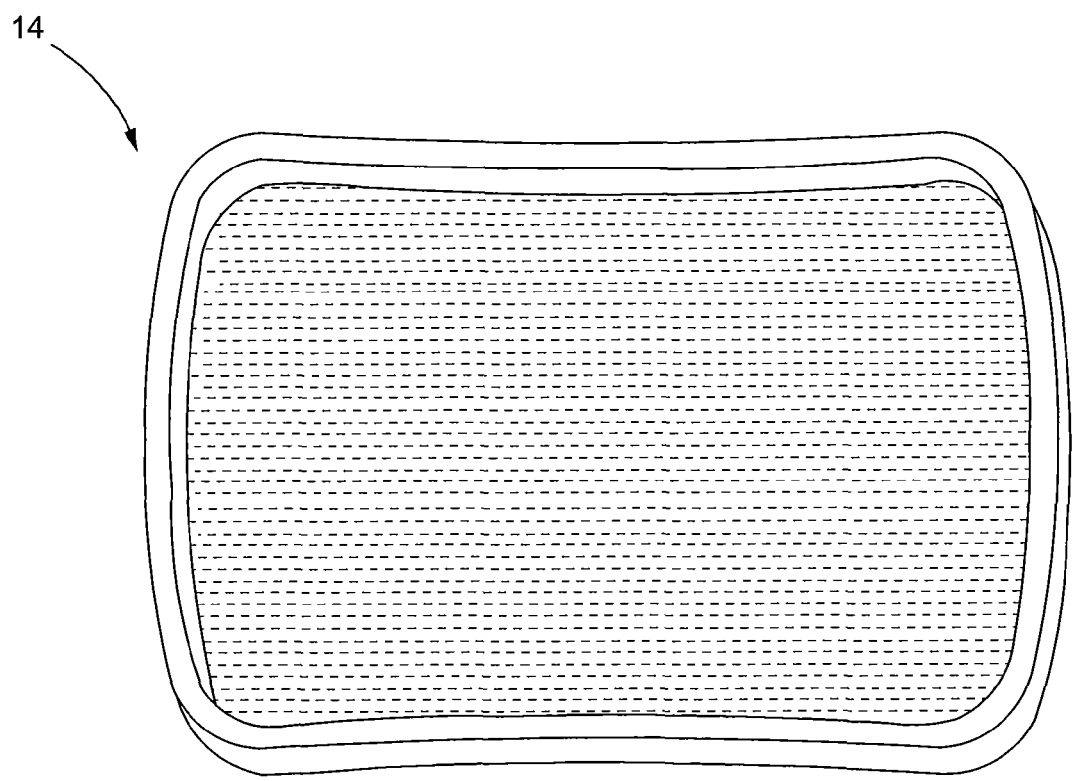
FIG. 7 is a plan view of a base layer of the front panel overlay of FIG. 1, constructed in accordance with at least some embodiments of the present disclosure.

Beneath the bottom circuit layer 12, the base layer 14 may be found. As shown specifically in FIG. 7, the base layer 14 may be a rigid layer employed to provide stability and rigidity to the flexible layers of the front panel overlay 2. While the base layer 14 need not always be employed, to improve the durability of the front panel overlay 2, the base layer is typically used. In at least some embodiments, the base layer 14 may be composed of plastic, glass, fiberglass, aluminum, steel or other suitable material, as discussed above.

From the foregoing, it can be seen that the front panel overlay 2 includes a membrane switch 54 comprised of the top circuit layer 8 and the bottom circuit layer 12, with or without the spacer layer 10 and base layer 14. Depending on whether the contacts of the top circuit layer 8 and bottom circuit layer 12 are in contact, the membrane switch 54 is either open or closed.

INDUSTRIAL APPLICABILITY

In general, the present disclosure sets a front panel overlay incorporating one or more logic circuits to provide a local processing capability to the front panel overlay itself. As described above, the front panel overlay may be composed of a plurality of layers including a graphics layer, a top circuit layer, a spacer layer, a bottom circuit layer and a base layer. One or more logic circuits may be incorporated within the top circuit layer and/or the bottom circuit layer or other layers for processing information received from the device employing the front panel overlay upon actuation of the switch. By incorporating the much smaller, lower profile imprinted logic circuits, even thinner form factors can be achieved for a front panel overlay.

Figure 8:
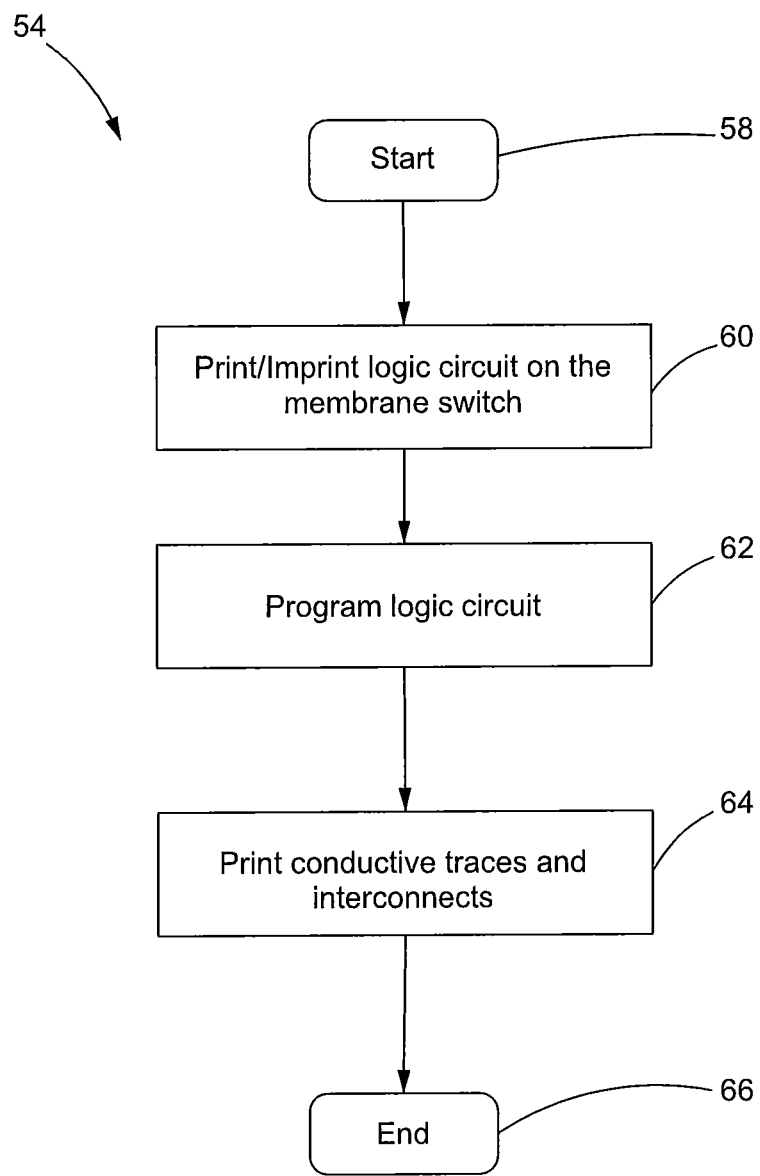
FIG. 8 is an exemplary flowchart outlining a sample sequence of steps for printing and/or imprinting one or more logic circuits on the layers of the front panel overlay of FIG. 1.
Figure 9:
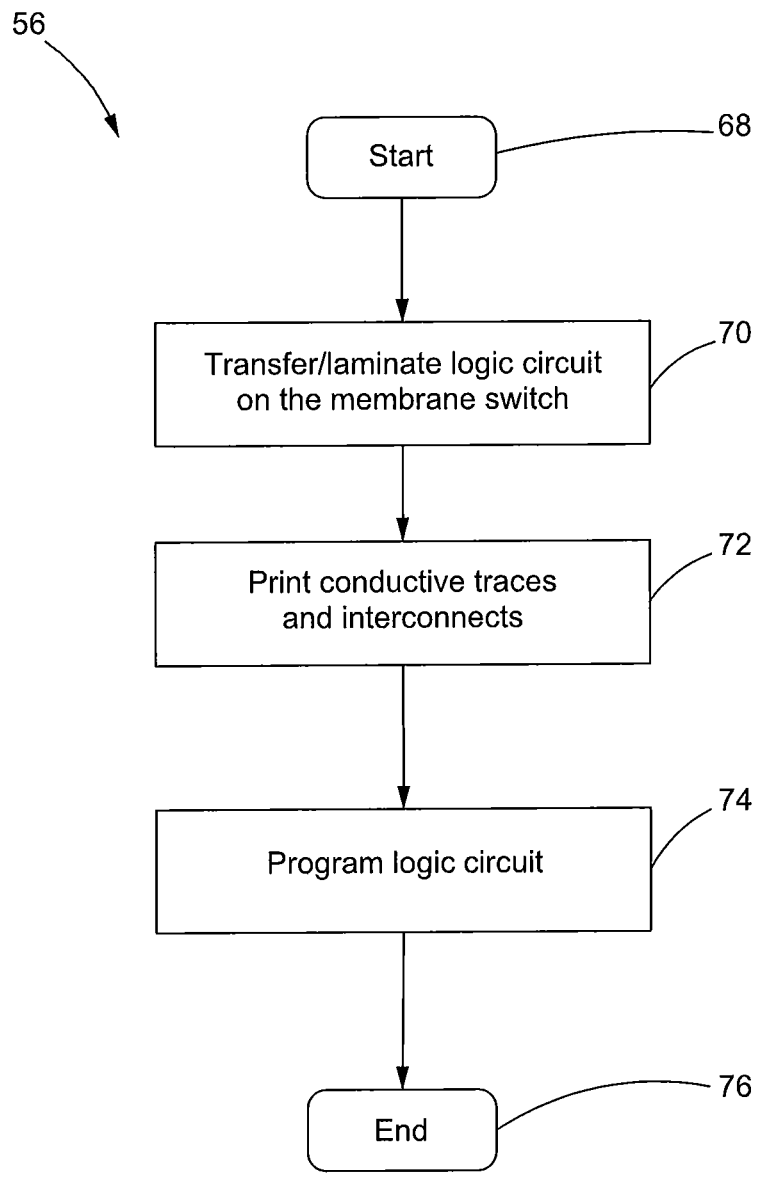
FIG. 9 is an exemplary flowchart outlining a sample sequence of steps for laminating the one or more logic circuits on the layers of the front panel overlay of FIG. 1.

Referring now to FIGS. 8 and 9, flowcharts 54 and 56, respectively, outlining steps for incorporating the logic circuit 42 in the front panel overlay 2 are shown, in accordance with at least some embodiments of the present disclosure. Specifically, the flowchart 54 shows a method for printing or imprinting the logic circuit 42 onto the front panel overlay 2, while the flowchart 56 shows a method for laminating or transferring the logic circuit thereon. Turning first to the flowchart 54, after starting at a step 58, the logic circuit 42 (and any additional logic circuits) may be printed or imprinted on the desired ones of the plurality of layers 4 of the membrane circuit at a step 60. For example, the logic circuit 42 may be printed or imprinted on the top circuit layer 8 and/or the bottom circuit layer 12, as described above. Depending upon the shape and size of the front panel overlay 2, as well as the complexity of the logic circuit 42 that is desired, the logic circuit may be split into multiple logic circuit portions.

Furthermore, the logic circuit 42 (and any of the additional logic circuits) may be directly incorporated on one side of plurality of layers 4 of the front panel overlay 2. The method to print/imprint a logic circuit onto a thin flexible, possibly transparent surface is known in the art and, therefore, it has not been described here. For example, one technique to print/imprint very thin logic circuits is provided by PragmatIC™ Printing, headquartered in Cambridge, United Kingdom. Other similar techniques to print/imprint an ultra-thin logic circuit onto a flexible surface may be utilized as well.

After incorporating the logic circuit 42 onto the front panel overlay 2, the logic circuit 42 may be programmed to perform one or more desired operations at a step 62. For example, the logic circuit 42 on the front panel overlay 2 may be programmed to determine a battery level of the device on which the front panel overlay 2 is employed. Any number of other examples are of course possible as well. Next, the conductive traces and interconnects 38 to link the logic circuit 42 to the first and the second electrical contacts 34 and 36, respectively, of the top circuit layer 8 may be printed/imprinted and/or soldered at a step 64. It will be understood that while in the present embodiment, the logic circuit 42 is first programmed and then the conductive traces and interconnects 38 are printed/imprinted, this need not always be the case. In at least some embodiments, the conductive traces and interconnects 38 to link the logic circuit 42 to the electrical contacts 34 and 36 may be printed/imprinted first and then the logic circuit may be programmed. The process ends at a step 66 with the front panel overlay 2 being, ready for use.

Instead of attaching the logic circuit 42 directly on to the surface of the front panel overlay 2, in at least some embodiments, the logic circuit may be formed and then laminated on the front panel display 2. Thus, as shown in the flowchart 56, after starting at a step 68, the logic circuit 42 may first be printed/imprinted and then it may be transferred or laminated onto the front panel overlay 2 (e.g., to the top circuit layer 8) at a step 70. The technique to laminate a logic circuit using conductive adhesives is known in the art and, therefore, it has not been described here.

After laminating the logic circuit 42 (and any additional logic circuits) to the front panel overlay 2, the conductive traces and interconnects 38 may be printed/imprinted and/or soldered to link the logic circuit to the first electrical contact 34 and the second electrical contact 36 at a step 72. The logic circuit 42 may then be programmed to determine a battery level of the device (other functions in other embodiments) incorporating the front panel overlay 2 at a step 74. Again, in at least some embodiments, the logic circuit 42 may be programmed before the conductive traces and interconnects 38 are printed/imprinted. The process then ends at a step 76 with the front panel overlay 2 being ready to use.

Figure 10:
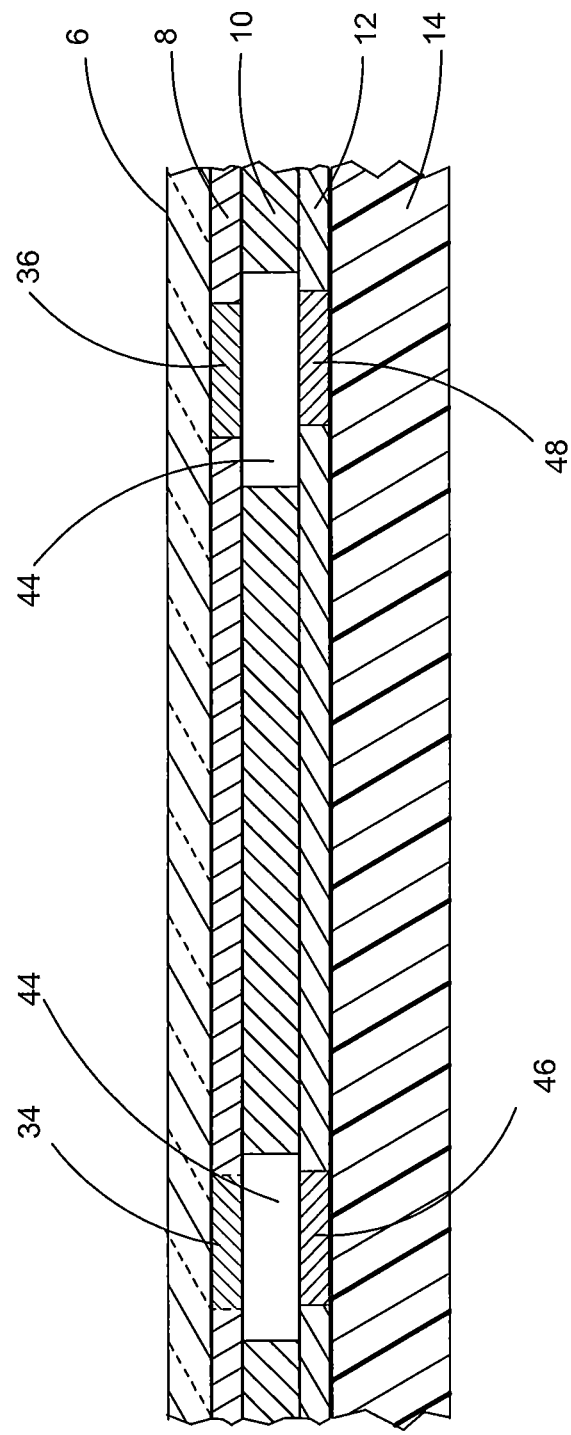
FIG. 10 is a cross-sectional view taken along line 10-10 of the front panel overlay of FIG. 1 showing the various layers of the front panel overlay in a non-operational state.
Figure 11:
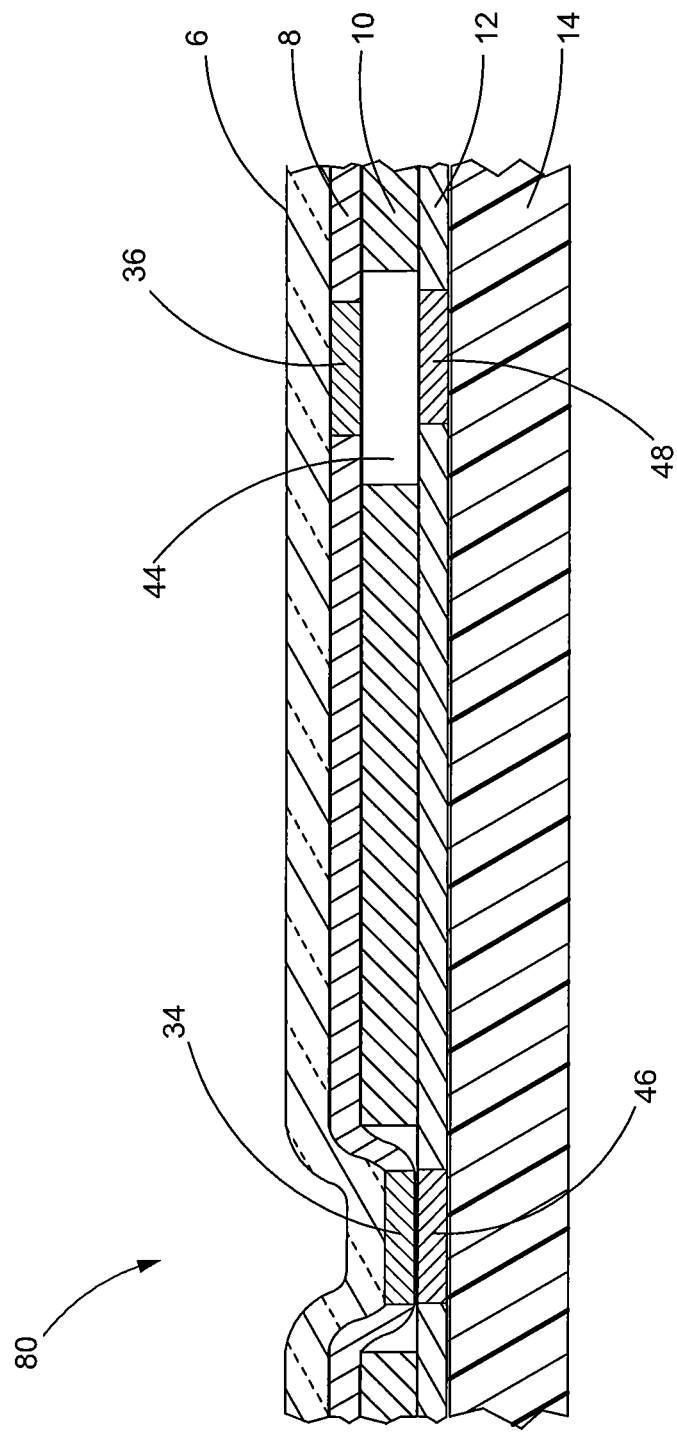
FIG. 11 is a cross-sectional view taken along line 10-10 of the front panel overlay of FIG. 1 showing the various layers of the front panel overlay in an operational state.

Turning now to FIGS. 10 and 11, cross-sectional views 78 and 80, respectively, taken along lines 10-10 of FIG. 1 show the operation of the front panel overlay 2 in accordance with at least some embodiments of the present disclosure. The cross-sectional view 78 in particular shows the front panel overlay 2 before being closed or actuated, and thus in a non-operational state; while the cross-sectional view 80 shows the front panel overlay 2 closed or actuated so as to be in an operational state, particularly when the first indicia 18 is actuated. Specifically and as shown in FIG. 10, when force against the first indicia 18 and/or the second indicia 20 is not exerted, the first electrical contact 34 remains separated from the third electrical contact 46, and the second electrical contact 36 remains separated from the fourth electrical contact 48 via the spacer layer 10. The electric circuit therefore remains open.

However, when the first indicia 18 and/or the second indicia 20 are actuated by exerting a downward force thereon, the first electrical contact 34 may touch the third electrical contact 46 and the second electrical contact 36 may touch the fourth electrical contact 48 through the spacer layer 10 to complete and close the electric circuit. The first electrical contact 34 closing the electric circuit with the third electrical contact 46 is shown in FIG. 11. After the electric circuit is closed, then the logic circuit 42 may be actuated and may turn the light emitting diode 52 associated with, the first indicator 22 on to indicate that the front panel overlay 2 and associated device are now operational. The continuity in the electric circuit is maintained only as long as force is exerted on the first indicia 18 or the second indicia 20. When the force is released, the electric continuity is broken (due to the spacer layer 10) and the logic circuit stops responding.

Thus, by providing a logic circuit in the front panel overlay 2, the front panel overlay 2 can provide certain logic functions, as opposed to prior art devices which rely entirely on a remote electronic processing unit deeper within the device to perform such functions. This capability may simplify the circuit design of the devices, which can now simply employ the front panel overlay 2 with the logic circuit instead of mounting those circuits within the device. Using the logic circuit within the front panel overlay 2 may also reduce the cost of the associated device, as indicated above, due to fewer traces and interconnects being needed between the front panel overlay 2 and the device, while the space saved may be utilized for adding new features to the device. Additionally, by incorporating the logic circuit within the front panel overlay 2, the shape, size and thickness of the membrane switch 54, and front panel overlay 2 as a whole, are not substantially affected (if at all) and the switch can still be provided in a thin, flexible and possibly transparent format.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A front panel overlay, comprising:
a first layer having a first electrical contact;
a second layer having a second electrical contact;
a third layer;
a flex cable extending from one of the first and second layers; and a logic circuit incorporated within one of the first and second, layers and in communication with the flex cable, the third layer overlying the logic circuit, the logic circuit being programmed to activate when the first electrical contact completes an electrical circuit with, the second electrical contact, the logic circuit configured to receive digital information from an input and an output port of the flex cable and locally perform at least one operation configured to output digital information to the third layer.

2. The front panel overlay of claim 1, wherein the logic circuit is at least one of printed and imprinted directly onto one of the first and second layers.

3. The front panel overlay of claim 1, wherein the logic circuit is laminated on one of the first and second layers.

4. The front panel overlay of claim 1, wherein the logic circuit is connected at least indirectly to the first electrical contact and the second electrical contact via a plurality of conductive traces and interconnects.

5. The front panel overlay of claim 1, wherein the first layer is a top circuit layer and the logic circuit is incorporated within the top circuit layer.

6. The front panel overlay of claim 1, wherein the third layer is a graphics layer having a plurality of input/output devices for interacting with and displaying feedback to a user.

7. The front panel overlay of claim 1, wherein the second layer is a bottom circuit layer, the bottom circuit layer having the second electrical contact.

8. The front panel overlay of claim 1, further including a spacer layer interposed between the first layer having the first electrical contact and the second layer having the second electrical contact.

9. The front panel overlay of claim 1, further including a base layer for providing stability to the other layers.

10. The front panel overlay of claim 1, wherein the logic circuit communicates with a printed circuit board remotely located relative to front panel overlay.

11. A method of incorporating a logic circuit in a front panel overlay, the method comprising:
    providing a plurality of layers in operational association with one another;
    forming a logic circuit onto one or more of the plurality of layers, at, least one of the plurality of layers overlying the logic circuit;
    providing a flex cable extending from one or more of the plurality of layers, the logic circuit communicating with the flex cable;
    programming the logic circuit to locally perform at least one operation configured to output digital information to the at least one of the plurality of layers overlying the logic circuit;
    linking the logic circuit to electric circuitry on the plurality of layers using conductive traces and interconnects; and
    the logic circuit configured to receive digital information from an input and an output port of the flex cable.

12. The method of claim 11, wherein forming the logic circuit comprises at least one of printing and imprinting the logic circuit directly onto a surface of the plurality of layers.

13. The method of claim 11, wherein forming the logic circuit comprises laminating the logic circuit on to a surface of the plurality of layers.

14. The method of claim 11, wherein providing the plurality of layers includes providing a graphics layer, a top circuit layer, a spacer layer, a bottom circuit layer, and a base layer, and the forming the logic circuit step forms the logic circuit on one of the top circuit layer and bottom circuit layer with one of the graphics layer and base layer overlying the logic circuit.

15. A front panel overlay, comprising:
    a top circuit layer having a first electrical contact;
    a bottom circuit layer having a second electrical contact;
    a spacer layer interposed between the top circuit layer and the bottom circuit layer for selectively completing an electrical circuit by the first electrical contact and the second electrical contact;
    a flex cable extending from the top circuit layer;
    a graphics layer; and
    a logic circuit incorporated within the top circuit layer and in communication with the flex cable, the graphics layer overlying the logic circuit, the logic circuit at least indirectly linked to the first electrical contact such that when the electrical circuit is completed, the logic circuit is activated and configured to receive digital information from an input and an output port of the flex cable and the logic circuit being programmed to locally perform at least one operation configured to output digital information to the graphics layer.

16. The front panel overlay of claim 15, wherein the graphics layer has indicia corresponding in placement to the first electrical contact, such that upon exerting force against the indicia, the first electrical contact is forced against the second electrical contact through the spacer layer.

17. The front panel overlay of claim 16, wherein the graphics layer further includes input/output elements enabling feedback calculated by the logic circuit to be displayed to a user.

18. The front panel overlay of claim 15, wherein the logic circuit is at least one of printed, imprinted, and laminated on to the top circuit layer.

19. The front panel overlay of claim 15, wherein the logic circuit is formed on the same side of the top circuit layer as the first electrical contact.

20. The front panel overlay of claim 15, wherein the logic circuit is provided in a thin and flexible format.

* * * * *